3,053,625
PROCESS FOR THE SULFURIC ACID DIGESTION
OF TITANIFEROUS IRON MATERIAL
Donald P. Doll, Webster Groves, and Thomas S. Griffin, St. Louis, Mo., and John J. Libera, East St. Louis, Ill., assignors to National Lead Company, New York, N.Y., a corporatioin of New Jersey
Filed Feb. 16, 1959, Ser. No. 793,452
7 Claims. (Cl. 23—117)

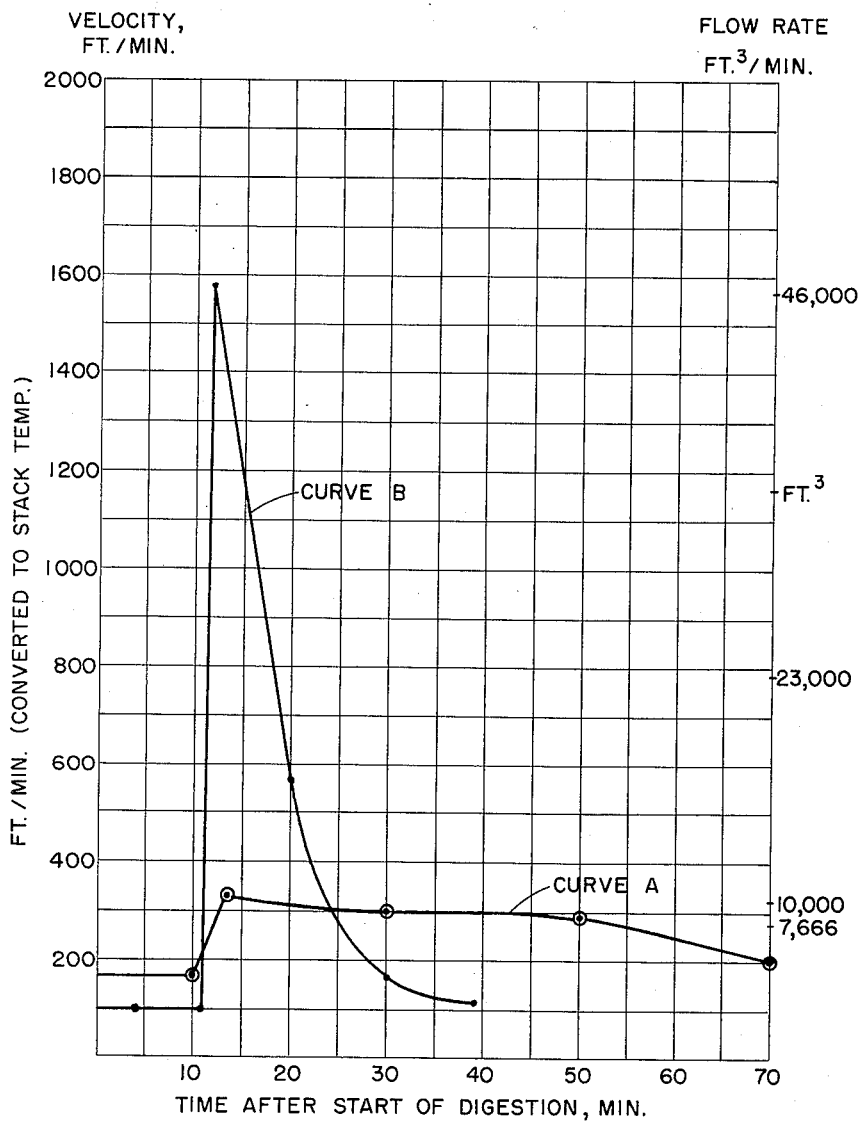

This invention relates in general to a method for solubilizing a titaniferous iron material. More specifically, it relates to an improved method for digesting or solubilizing a titaniferous iron material in concentrated sulfuric acid.

Many methods have been proposed for solubilizing titaniferous iron ores. These include reacting the ore with hydrochloric or sulfuric acid in various concentrations under a variety of conditions to solubilize the iron and titanium values. From a commercial standpoint the most successful of these methods is a batch digestion procedure in which the titaniferous iron ore is reacted with concentrated sulfuric acid in a large digestion tank. In such a process the ore and acid are mixed in the tank and steam and/or water are added to the mixture. The heat of dilution raises the temperature of the mixture to its reaction temperature. As soon as the reaction temperature is reached, an extremely violent reaction occurs and the entire mixture forms a porous solidified mass or, as it is sometimes called, a "digestion cake" in the matter of a few minutes. This "cake" is then retained in the digestion tank for a number of hours in order to cure the "cake." After curing, the dried "cake" is then dissolved in water or weak acid to obtain an iron sulfate and titanium sulfate solution. Such a process is more fully described and claimed in U.S. Patent No. 1,889,027.

Although this batch digestion process has been used commercially for the past 30 years, only very slight changes in the operating procedure have been made during this time period. Since the digestion reaction produced by this process is so extremely violent, it was believed that little could be done to alter this procedure without lowering the digestion recoveries.

This batch process, however, suffers from a number of disadvantages. The reaction between the ore and acid is limited to the utilization of certain reaction temperatures and acid concentrations. If, for example, the reaction temperature is allowed to go too high for a given ore, the reaction becomes so violent that it is impossible to retain the reacting mass in the digestion tank. Another disadvantage is that only certain types of titaniferous ores and concentrates may be used in this process. It was found, for example, that many ilmenite concentrates obtained from the various flotation processes produced such violent digestion reactions that even the employment of foam depressors could not suppress the violence of reaction to the extent that the reaction mass would not flow out of the top of the tank. As a result, great care had to be taken in selecting certain flotation agents which would produce flotation concentrates which could be used successfully in the commercial batch digestion process described above. In addition, various types of titanium slags and concentrates are by nature so extremely active when digested in concentrated sulfuric acid that they also could not be processed by the normal batch digestion procedure.

In addition to these disadvantages are the losses in heat, acid mist, $SO_3$, and finely divided ore which are emitted from the digestion stack during these violent reactions. It has been found that the flow rate of stack gases at its peak velocities exceeds 45,000 cu. ft./min. which is substantially impractical to recover through condensing systems.

Relatively high digestion recoveries are obtained by utilizing the commercial process described above; however, it has been found desirable to return the undissolved residue from a previous digestion in the form of a mud to a subsequent digestion in order to increase somewhat the overall digestion recovery.

An object of the instant invention, therefore, is to provide a method for digesting a titaniferous iron ore to render soluble, in aqueous media, the titanium and iron values wherein the digestion reaction temperatures and acid concentration ranges employed are not as limited as those employed in earlier batch digestion processes. A further object is to provide a digestion process in which the type of titaniferous iron ores and concentrates which may be employed are not as limited as those which are used in former commercial batch processes. A still further object is to provide a digestion process in which the digestion stack losses are held to a minimum. These and other objects will become more apparent from the following more complete description of the instant invention.

In its broadest aspects, this invention contemplates a process for digesting a titaniferous material selected from the group consisting of a titaniferous iron ore, concentrate and slag to render the titanium and iron values soluble in aqueous media which comprises reacting, in the bottom of a tank, a portion of said titaniferous material with concentrated sulfuric acid and water to form a porous solidified mass, adding to said tank the remainder of said titaniferous material and said concentrated sulfuric acid and water at a rate and in proportion to form and to maintain continually a relatively thin fluid, reacting layer of the additives on top of said porous solidified mass, the level of said fluid reacting layer progressively rising in said tank and said solidified mass progressively building up as the titaniferous material and acid are added to react and form continually the fluid, reacting layer of the aditives which in turn forms more of said solidified mass, the heat released by the formation of said solidified mass being utilized at least in part to aid in initiating the reaction between said acid and said titaniferous material in said fluid reacting layer, and after the addition of all of said ore and said acid, curing said mass and subsequently dissolving said mass in aqueous media.

In carrying out the digestion process of the instant invention, it is desirable to employ finely ground titaniferous material in order to obtain high recoveries of the titanium values. Ground ore, concentrates, and slags having a size range smaller than 200 mesh have been found to be particularly satisfactory. The digestion recoveries decrease somewhat if coarser material is employed.

The amount of sulfuric acid employed is dependent upon the analysis of the titaniferous material used. It is desirable to add sufficient sulfuric acid to produce both titanium sulfate and iron sulfates from the titanium and iron values in the titaniferous material. Usually the theoretical quantities of sulfuric acid are employed to produce: (1) iron sulfates from the ferrous and ferric iron values in the ore; and (2) titanium sulfate which lies somewhere between the normal titanium sulfate, $Ti(SO_4)_2$, and titanyl sulfate, $TiOSO_4$. It has been found to be particularly satisfactory to employ sulfuric acid (in addition to that required to form iron sulfates) in amount to obtain a weight ratio of $H_2SO_4/TiO_2$ of 1.7 to 2.4.

The concentration of the sulfuric acid may vary considerably but it has been found desirable to employ concentrations from 82% to 95% at reaction in order to obtain a rapid digestion. It is preferred, however, to employ acid concentrations of 86% to 91% at the time of reaction for ores while 88% to 94% is preferred for slags. It is also desirable to employ higher initial acid concentrations which may be cut with water, steam or weak acid before reaction. This heat of dilution is useful in initiating the digestion reaction. It has been found desirable to employ initial acid concentrations which are at least 2% higher than the concentration used at reaction.

In order to initiate the reaction the mixture of the titaniferous material and the acid are heated either directly or indirectly, particularly by the addition of steam. A more convenient way is to employ sulfuric acid of higher concentrations, say 91% to 98% and to add water in a quantity to reduce the concentration at the time of reaction to 86% to 91%. The heat of dilution will in most instances be sufficient to produce the necessary temperature required for the reaction of the titaniferous material and acid mixture. When the fluid titaniferous material and acid mixture attains its reaction temperature, say from 100° C. to 175° C. a very rapid reaction takes place and the fluid mixture becomes a porous solidified mass in a matter of a few seconds.

In carrying out the process of the instant invention, a portion of the titaniferous material and acid are placed in a tank and the mixture is heated by steam or by the heat of dilution to the reaction temperature. As the reaction proceeds, a porous solidified mass is formed in the bottom of the tank. During this reaction vapors of steam rise from the mass.

As the mass solidifies in the tank, more of the titaniferous material and acid, in the proportions described above, are added continuously to the tank and form instantaneously a fluid reacting layer on top of the solidified mass. The heat in the form of steam rising from the solidified mass along with a small amount of added water, heats the fluid layer to reaction temperature and more of the solidified mass builds up gradually in the tank under the fluid, reacting layer which is present on top of the mass.

The titaniferous material and the acid are added at a rate sufficient to maintain constantly the thin fluid reacting layer on top of the cake as the reaction proceeds. The rate of addition, however, is kept below the point at which an excessive flow rate of stack fumes is produced which cannot be handled conveniently. It has been found that for a commercial size digestion tank which processes 20 tons of ore at one time, it is convenient to introduce the titaniferous material and acid mixture preferably continually over a period of from 20 minutes to 2 hours. With such a time cycle the flow rate of stack gases is held fairly constant; that is, within the range of from 5800 cu. ft./min. to 10,000 cu. ft./min. Gas flow rates within this range may be easily handled in any suitable condensing or collecting system.

The titaniferous material and the acid may be added in any manner provided a fluid layer of the additives is maintained on top of the solidified digestion mass. The titaniferous material and the acid may be admixed in the above described proportions for example, and the mixture added either continuously or in small increments over a period of 20 minutes to 2 hours, or the titaniferous material and the acid may be added simultaneously as separate streams if desired. It has been found, however, that if the titaniferous material and the acid are premixed before being reacted in the digestion tank, that the titaniferous material has a better chance to become more thoroughly wetted by the acid before the reaction takes place.

Within this range of flow rates, the sulfur trioxide in the stack gases may be collected and recovered for reuse. It has also been found that at these stack gas flow rates, the amount of ore and acid mist entrained in the gases is held to a minimum.

In FIGURE 1 is shown a graph (curve A) of the stack gas velocities and flow rates obtained by utilizing the process of the instant invention compared to the stack gas velocities and flow rates (curve B) obtained by a regular batch tank digestion.

It should be noted from the curves of FIGURE 1 that the flow rate of stack gases released during the digestion reaction of the instant invention is held fairly constant during the duration of the run while the flow rate of stack gases in the normal batch tank digestion rises to a sudden peak which is 5 times the maximum flow rate of stack gases released by the digestion process of the instant invention.

In order to illustrate further the instant invention, the following examples are presented:

EXAMPLE 1

An ilmenite ore was ground to pass a 200 mesh screen. The ore had the following analysis:

| | Percent |
|---|---|
| $TiO_2$ | 48.3 |
| FeO | 33.9 |
| $Fe_2O_3$ | 6.6 |
| Other oxides | 11.2 |
| | 100 |

39,600 pounds of this finely ground ilmenite ore were mixed under agitation with 66,500 pounds of 93% sulfuric acid to form a thin slurry. The acid:ore ratio in the mixture was 1.56:1.0.

17,700 pounds of the slurry representing 17% of the total slurry and 455 pounds of water to set-off the digestion reaction and to cut the sulfuric acid concentration to 89% were added to the bottom of a commercial batch digestion tank. Thirty pound steam at the rate of 35 pounds per minute was passed up through the ore-acid mixture in the digest tank for 13 minutes to heat the mixture to 150° C. The reaction was started substantially instantaneously and after 3 minutes, the reactants formed a solidified mass.

The remainder of the ore-acid slurry, together with additional water, were added continuously to the digestion tank in order to form continually a reacting, fluid layer of the additives on top of the solidified digestion mass. The rates of addition of the ore-acid mixture and the water were 2360 pounds per min. and 69 pounds per min., respectively.

As the ore-acid slurry and the water were added, steam emitted by the solidified mass heated the fluid layer to a temperature above 190° C. and the thin fluid layer quickly formed more of the solidified mass. The amount of water added in addition to the steam issuing from the solidified mass lowered the sulfuric acid concentration to 89% at the time of reaction. The continuous additions were made over a period of 45 minutes.

During the reaction, the reacting, fluid layer obtained a peak temperature of 203° C.

After the additions were completed the entire solidified mass was allowed to cure for 2 hours. During this time period, the temperature of the solidified mass dropped from 196° C. to 150° C.

120,000 pounds of 7% sulfuric acid were added to the solidified mass to dissolve the soluble material. With agitation the solidified mass dissolved in 9 hours at a temperature of 75° C.

The solution was analyzed and found to contain 94.6% of the titanium values and 97% of the iron values originally present in the ilmenite ore employed.

The rate of gas flow from the digestion stack never exceeded 10,000 ft.³/min. with a maximum linear velocity of 330 ft./min. while the regular batch tank digestion had a maximum flow rate of more than 45,000 ft.³/min. with a linear velocity of more than 1500 ft./min.

Curve A in FIGURE 1 of the drawing represents the stack gas flow rates and velocities obtained in the digestion of Example 1 while curve B represents the flow rates and velocities obtained in a regular plant batch digestion process. It becomes obvious that in the latter case the stack gas flow rates are extremely high and hence losses of heat, acid mist and $SO_3$ are excessive while the stack flow rates obtained by the method of the instant invention are relatively low and easily handled; therefore, stack gas losses are held to a minimum.

The operational details and the results obtained are recorded in the table below.

EXAMPLE 2

The procedure of Example 1 was repeated except that 98.3% sulfuric acid was used in place of 93% acid. Slightly more water was added as set-off water in order to cut the acid concentration to 90% at reaction.

Substantially identical operational conditions were employed except a slightly higher digestion recovery (95.7%) of the titanium values was obtained.

The operational details and results obtained are recorded in the table below.

EXAMPLE 3

In this example the procedure of Example 1 was again repeated except that the ore and acid were not premixed before adding them to the digestion tank. The ore and acid were added as separate streams continuously to the tank. The amounts employed, however, were the same as those used in Example 1. Again substantially identical results were obtained. The recovery of the titanium values was 94.8%.

EXAMPLE 4

In this example a titanium concentrate was employed. This titanium concentrate was prepared from a flotation concentration process in which an ilmeno-magnetite ore was processed using oleic acid and pine oil as flotation agents. This titanium concentrate was ground to minus 200 mesh and had the following analysis.

| | Percent |
| --- | --- |
| $TiO_2$ | 45.8 |
| FeO | 38.6 |
| $Fe_2O_3$ | 6.9 |
| Others | 8.7 |
| | 100.0 |

A titanium concentrate of this type, i.e. a concentrate recovered from a flotation process employing oleic acid and pine oil without the use of a defoamer, usually is so active, when reacted in concentrated sulfuric acid by the usual commercial batch digestion process, that it runs over the top of the digestion tank. In such cases elaborate means must be provided to handle such an active material.

However, when processing this type of titanium concentrate by the procedure described in Example 1 no difficulties were encountered. The digestion reaction proceeded in the normal manner and no overflow was encountered. The details of operation are recorded in the table below.

EXAMPLE 5

A titanium concentrate, in this case a slag, prepared from a smelting process of a titaniferous iron ore had the following analysis:

| | Percent |
| --- | --- |
| $TiO_2$ | 73.4 |
| FeO | 2.9 |
| $Fe_2O_3$ | 7.7 |
| Others | 16.0 |
| | 100.0 |

This slag had particles of size smaller than 200 mesh.

This particular slag is like the titanium concentrate used in Example 4 in that it is very reactive when digested in concentrated sulfuric acid, even without acceleration by the commercial batch digestion process.

However, when this particular slag was digested in the same manner as that described in Example 1, no run over or excessive violence occurred.

The results and operational data are recorded in the table below.

*Table*

| | Ex. 1 | Ex. 2 | Ex. 3 | Ex. 4 | Ex. 5 |
| --- | --- | --- | --- | --- | --- |
| Type of Titaniferous Material | Ilmenite Ore | Ilmenite Ore | Ilmenite Ore | Titanium Conc. | Titanium Slag |
| Amt. of Titaniferous Material Used (lbs.) | 39,600 | 39,600 | 38,500 | 45,000 | 40,000 |
| Initial Conc. of Sulfuric Acid (percent) | 93 | 98 | 93 | 93 | 96 |
| Amt. of Sulfuric Acid Used (lbs.) | 66,500 | 60,600 | 59,700 | 82,300 | 68,800 |
| Method of Addition of Titaniferous Material and Acid | Premix Slurry | Premix Slurry | Separate Streams | Premix Slurry | Separate Streams |
| Acid: Ore Ratio Used | 1.56:1 | 1.50:1 | 1.44:1 | 1.70:1 | 1.65:1 |
| Amt. of Water Added (lbs.) | 3,100 | 6,000 | 2,680 | 4,700 | 3,700 |
| Percent Total Titaniferous Material and Acid Added for Initial Reaction (percent) | 17 | 20 | 8 | 20 | 9 |
| Peak Temp. of Reaction (° C.) | 196–203 | 195–205 | 188–202 | 195–201 | 198–210 |
| Conc. of Sulfuric Acid at Reaction (percent) | 89 | 91 | 89 | 88 | 91 |
| Rate of Additional of Titaniferous Material (lbs./min.) | 880 | 1,320 | 642 | 1,072 | 615 |
| Rate of Addition of Sulfuric Acid (lbs./min.) | 1,480 | 2,020 | 995 | 1,960 | 1,060 |
| Rate of Addition of Water (lbs./min.) | 69 | 200 | 45 | 112 | 58 |
| Total Time of Addition of Reactants (Min.) | 45 | 30 | 60 | 42 | 65 |
| Time of Curing (Hrs.) | 2 | 2 | 2 | 1 | 6 |
| Temp. of Curing (° C.) | 150–196 | 155–195 | 150–188 | 160–195 | 140–185 |
| Time of Dissolving (Hrs.) | 9 | 11 | 9 | 6 | 7 |
| Temp. of Dissolving (° C.) | 60–75 | 60–80 | 60–75 | 60–75 | 60–70 |
| Titanium Values Recovered (percent) | 94.6 | 95.7 | 94.8 | 94.0 | 97.3 |
| Maximum Stack Gas Flow Rate (cu. ft./min.) | 9,339 | 10,188 | <9,000 | | |
| Maximum Stack Gas Linear Velocity (ft./min.) | 330 | 340 | <300 | | |

From the above description and by the examples presented it has clearly been shown that substantially any type of titaniferous material may be digested by the process of the instant invention without encountering an excessive violence of reaction which is difficult if not impossible to handle in the normal commercial batch digestion process. In addition, the process of the instant invention is amenable to more variations in the operational details and therefore is more flexible than the normal batch digestion process.

The maximum flow rates of stack gases are reduced to only a fraction of the rates usually encountered in present commercial processes and therefore the gases can be recovered readily with appreciable economies of operation.

While this invention has been described and illustrated by the examples shown, it is not intended to be strictly limited thereto and other modifications and variations may be employed within the scope of the following claims.

We claim:

1. A process for digesting a titaniferous material selected from the group consisting of a titaniferous iron ore, concentrate and slag to render the titanium and iron values soluble in aqueous media which comprises reacting, in the bottom of a tank, a portion of said titaniferous material with concentrated sulfuric acid in sufficient amount and concentration to form a porous solidified mass, adding to said tank the remainder of said titaniferous material and said concentrated sulfuric acid and water at a rate and in the same proportions to react and produce momentarily and continually a relatively thin, fluid, layer of the additives on top of said porous solidified mass, said fluid layer substantially immediately forming more of said porous solidified mass, the level of said fluid, reacting layer of the additives progressively building up as the titaniferous material and acid are added to form momentarily and continually the fluid, reacting layer which in turn forms substantially immediately more of said solidified mass, the heat released by the formation of said solidified mass being utilized at least in part to aid in initiating the reaction between said acid and said titaniferous material in said fluid, reacting layer, and after the addition of all of said titaniferous material and said acid, curing said mass and subsequently dissolving said mass in aqueous media.

2. Process according to claim 1 in which said titaniferous material and said acid are premixed and the mixture is added continuously to the tank to form continually said fluid, reacting layer of the additives in said tank.

3. Process according to claim 1 in which said titaniferous material and said acid are added separately and continuously to said tank to form continually said fluid, reacting layer of the additives in said tank.

4. Process according to claim 1 in which said titaniferous material and said acid are added over a period of from 20 minutes to 2 hours.

5. Process according to claim 1 in which said titaniferous material is a titaniferous iron ore.

6. Process according to claim 1 in which said titaniferous material is a titaniferous concentrate.

7. Process according to claim 1 in which said titaniferous material is a titaniferous slag.

References Cited in the file of this patent
UNITED STATES PATENTS

| | | |
|---|---|---|
| 2,138,090 | Coffelt | Nov. 29, 1938 |
| 2,850,357 | Myers | Sept. 2, 1958 |

UNITED STATES PATENT OFFICE
CERTIFICATE OF CORRECTION

Patent No. 3,053,625                      September 11, 1962

Donald P. Doll et al.

It is hereby certified that error appears in the above numbered patent requiring correction and that the said Letters Patent should read as corrected below.

Column 6, lines 15 and 16 should appear as shown below instead of as in the patent:

$$FeO \text{ -------- } 7.7$$
$$Fe_2O_3 \text{ ------- } 2.9$$

Signed and sealed this 26th day of February 1963.

(SEAL)

Attest:

ESTON G. JOHNSON
Attesting Officer

DAVID L. LADD
Commissioner of Patents